US011552945B2

(12) United States Patent
McBain et al.

(10) Patent No.: US 11,552,945 B2
(45) Date of Patent: *Jan. 10, 2023

(54) TRANSACTION AUTHENTICATION

(71) Applicant: NCR Corporation, Atlanta, GA (US)

(72) Inventors: Bruce McBain, Pleasanton, CA (US);
Charlie Harrow, Dundee (GB);
Husameldin M Ali Ibrahim, San Francisco, CA (US)

(73) Assignee: NCR Corporation, Atlanta, GA (US)

( * ) Notice: Subject to any disclaimer, the term of this patent is extended or adjusted under 35 U.S.C. 154(b) by 96 days.

This patent is subject to a terminal disclaimer.

(21) Appl. No.: 17/243,813

(22) Filed: Apr. 29, 2021

(65) Prior Publication Data
US 2021/0250347 A1 Aug. 12, 2021

Related U.S. Application Data

(63) Continuation of application No. 16/112,753, filed on Aug. 26, 2018, now Pat. No. 11,057,377.

(51) Int. Cl.
*H04L 9/40* (2022.01)
*G06F 21/35* (2013.01)
(Continued)

(52) U.S. Cl.
CPC .......... *H04L 63/0861* (2013.01); *G06F 21/35* (2013.01); *G06F 21/43* (2013.01);
(Continued)

(58) Field of Classification Search
CPC .......... G06F 21/32; G06F 21/35; G06F 21/43; H04L 63/0428; H04L 63/0807;
(Continued)

(56) References Cited

U.S. PATENT DOCUMENTS 7,690,032 B1 * 3/2010 Peirce .................. G06F 21/32
713/172
8,041,956 B1 * 10/2011 White ................ H04L 63/0861
713/186

(Continued)

OTHER PUBLICATIONS

Abidin, Aysajan, Enrique Argones Rúa, and Roel Peeters. "Uncoupling biometrics from templates for secure and privacy-preserving authentication." Proceedings of the 22nd ACM on Symposium on Access Control Models and Technologies. 2017, pp. 21-29. (Year: 2017).*

(Continued)

*Primary Examiner* — Kari L Schmidt
(74) *Attorney, Agent, or Firm* — Schwegman, Lundberg & Woessner

(57) ABSTRACT

A biometric token is generated for a user and provided to a user-operated device. A pre-staged transaction is defined by a user and the user supplies the token for association with the pre-staged transaction. Subsequently, a user visits a transaction terminal and a new candidate token is generated from biometric attributes of the user. The candidate token is matched to the token associated with pre-staged transaction to authenticate the user and the pre-staged transaction is processed at the transaction terminal as a completed transaction.

18 Claims, 4 Drawing Sheets

(51) Int. Cl.
 *G06F 21/43* (2013.01)
 *G06Q 20/20* (2012.01)
 *G06F 13/42* (2006.01)

(52) U.S. Cl.
 CPC ......... *G06Q 20/20* (2013.01); *H04L 63/0428* (2013.01); *H04L 63/0807* (2013.01); *G06F 13/4282* (2013.01); *G06F 2213/0042* (2013.01)

(58) Field of Classification Search
 CPC ............. H04L 63/0861; H04W 12/069; G06Q 20/40145; G06Q 20/1085; G06Q 20/3223; G06Q 20/3224; G06Q 20/40; G06Q 20/206
 See application file for complete search history.

(56) References Cited

U.S. PATENT DOCUMENTS

| | | | | |
|---|---|---|---|---|
| 8,397,988 | B1* | 3/2013 | Zuili | G06Q 20/409 235/383 |
| 9,215,512 | B2* | 12/2015 | Cohen | H04N 21/8355 |
| 10,142,333 | B1* | 11/2018 | Griffin | H04L 9/3247 |
| 10,263,787 | B1* | 4/2019 | Gelman | G06F 21/445 |
| 10,373,148 | B1* | 8/2019 | Dixon | G06Q 20/22 |
| 10,614,204 | B2* | 4/2020 | Tussy | G06V 40/18 |
| 2003/0065626 | A1* | 4/2003 | Allen | G06F 21/32 705/76 |
| 2006/0064380 | A1* | 3/2006 | Zukerman | G06Q 20/10 705/44 |
| 2007/0250718 | A1* | 10/2007 | Lee | H04L 63/0861 713/186 |
| 2008/0114697 | A1* | 5/2008 | Black | G06Q 20/3674 705/67 |
| 2009/0037335 | A1* | 2/2009 | McNamara | G06Q 20/10 705/54 |
| 2012/0174198 | A1* | 7/2012 | Gould | H04L 63/0807 726/6 |
| 2013/0036459 | A1* | 2/2013 | Liberman | H04L 9/0866 726/6 |
| 2013/0081119 | A1* | 3/2013 | Sampas | G06Q 20/40145 726/7 |
| 2014/0172703 | A1* | 6/2014 | Black | G07F 19/20 705/43 |
| 2014/0214630 | A1* | 7/2014 | N | G07F 9/009 705/27.2 |
| 2015/0220917 | A1* | 8/2015 | Aabye | G06Q 20/3278 705/64 |
| 2016/0012217 | A1* | 1/2016 | Wolf | H04N 5/23229 382/116 |
| 2016/0026840 | A1* | 1/2016 | Li | G06V 40/1306 348/77 |
| 2016/0105425 | A1* | 4/2016 | Clausen | G06Q 50/265 726/6 |
| 2016/0277380 | A1* | 9/2016 | Wagner | H04L 63/0861 |
| 2016/0292712 | A1* | 10/2016 | Tezuka | G06Q 30/0238 |
| 2016/0321627 | A1* | 11/2016 | McCracken | G06Q 20/3278 |
| 2017/0142102 | A1* | 5/2017 | Toyoshima | G06F 21/32 |
| 2017/0243225 | A1* | 8/2017 | Kohli | G06Q 20/40145 |
| 2018/0047000 | A1* | 2/2018 | Kuchenski | G06Q 20/3821 |
| 2018/0137483 | A1* | 5/2018 | McCann | G06Q 20/385 |
| 2018/0165663 | A1* | 6/2018 | Naik | G06Q 20/3223 |
| 2018/0167387 | A1* | 6/2018 | Bhatt | H04L 63/0853 |
| 2018/0189583 | A1* | 7/2018 | Wohlken | H04L 9/3231 |
| 2018/0189788 | A1* | 7/2018 | Lacoss-Arnold | G06Q 20/425 |
| 2019/0087825 | A1* | 3/2019 | Bhatt | G07F 7/125 |
| 2019/0303945 | A1* | 10/2019 | Mitra | G06Q 20/341 |
| 2019/0378142 | A1* | 12/2019 | Darnell | H04L 9/3297 |
| 2020/0005263 | A1* | 1/2020 | Arora | G07F 19/207 |
| 2020/0021579 | A1* | 1/2020 | Bhargava | G10L 17/22 |
| 2020/0053077 | A1* | 2/2020 | Merrell | G06Q 20/40145 |
| 2020/0092102 | A1* | 3/2020 | Wang | H04W 12/06 |
| 2021/0027295 | A1* | 1/2021 | Raquepaw | G07F 19/206 |
| 2021/0042673 | A1* | 2/2021 | Lieberman | G06Q 10/0633 |

OTHER PUBLICATIONS

K. Nandakumar, N. Ratha, S. Pankanti and S. Darnell, "Secure one-time biometric tokens for non-repudiable multi-party transactions," 2017 IEEE Workshop on Information Forensics and Security (WIFS), 2017, pp. 1-6 (Year: 2017).*

* cited by examiner

TRANSACTION AUTHENTICATION

CROSS-REFERENCE TO RELATED APPLICATION

This application is a continuation of U.S. patent application Ser. No. 16/112,753, filed Aug. 26, 2018, which application and publication are incorporated herein by reference in their entirety.

BACKGROUND

Technology has advanced consumer transactions in a variety of manners. One of the first conveniences that technology provided was introduced decades ago as Self-Service Terminals (SSTs), which permitted consumers to check out or perform banking transactions without clerk assistance. More recently, mobile phones can be used by consumers to perform Self-Service (SS) checkouts within retail stores or remote from any specific brick-and-mortar stores. In some cases, the mobile phones interact with SSTs at retail locations to perform SS checkouts.

Some transactions raise more security concerns for both the consumers and the retailers than other transactions do. For example, an Automated Teller Machine (ATM—one type of SST) is capable of dispensing currency to consumers. The currency in the ATM and the account balance of a consumer with a financial institution are both at risk of loss when unauthorized withdrawals are performed at the ATM by someone other than the true consumer.

Typically, ATMs provide a variety of security features (hardware and software) to thwart theft from the financial institutions and from the consumers' accounts. For instance, ATMs include encrypted Operating Systems (OSs), secure peripherals that perform independent security operations for each transaction, and secure network connections to financial networks. The consumer performs a transaction by inserting a bank card into a card reader peripheral and providing a Personal Identification Number (PIN) through an encrypted PIN pad at the ATM. Yet, security measures can and are still breached resulting in losses to both the consumer and the financial institution.

A financial institution may also face substantial regulatory liabilities as a result of security breaches of the institution's customer data assets. Thus, institutions do not want to be responsible for centrally housing even more customer information in a perceived effort to improve security because even the best-intended security can be compromised and data centrally stored can result in liability for exposure to the entire institution's customer base.

As more convenience in transaction processing is offered by retailers and financial institutions, additional security measures are needed. Adding secure hardware and software security techniques may be unrealistic for many retailers and, is particularly problematic for financial institutions because legacy security provided in the ATM hardware and software is tightly coupled together, such that one small change to accommodate a new consumer feature can require substantial amounts of hardware and human resource capital outlays.

Consequently, and largely due to security concerns and potential liabilities of financial institutions during a data breach, financial institutions are reluctant and, in some instances, actively resistant to adding any new transaction-based features at their ATMs for consumer convenience and/or to centrally storing additional sensitive consumer data.

SUMMARY

In various embodiments, methods and a transaction terminal for transaction authentication processing are presented.

According to an embodiment, a method for transaction authentication processing is presented. A candidate biometric token for a user is received from a transaction terminal. The candidate biometric token is matched to a biometric token associated with a pre-staged transaction of the user and the user is authenticated based on a match. Next, pre-staged transaction is provided to the transaction terminal for processing a transaction on the transaction terminal on behalf of the user.

DETAILED DESCRIPTION

Figure 1:
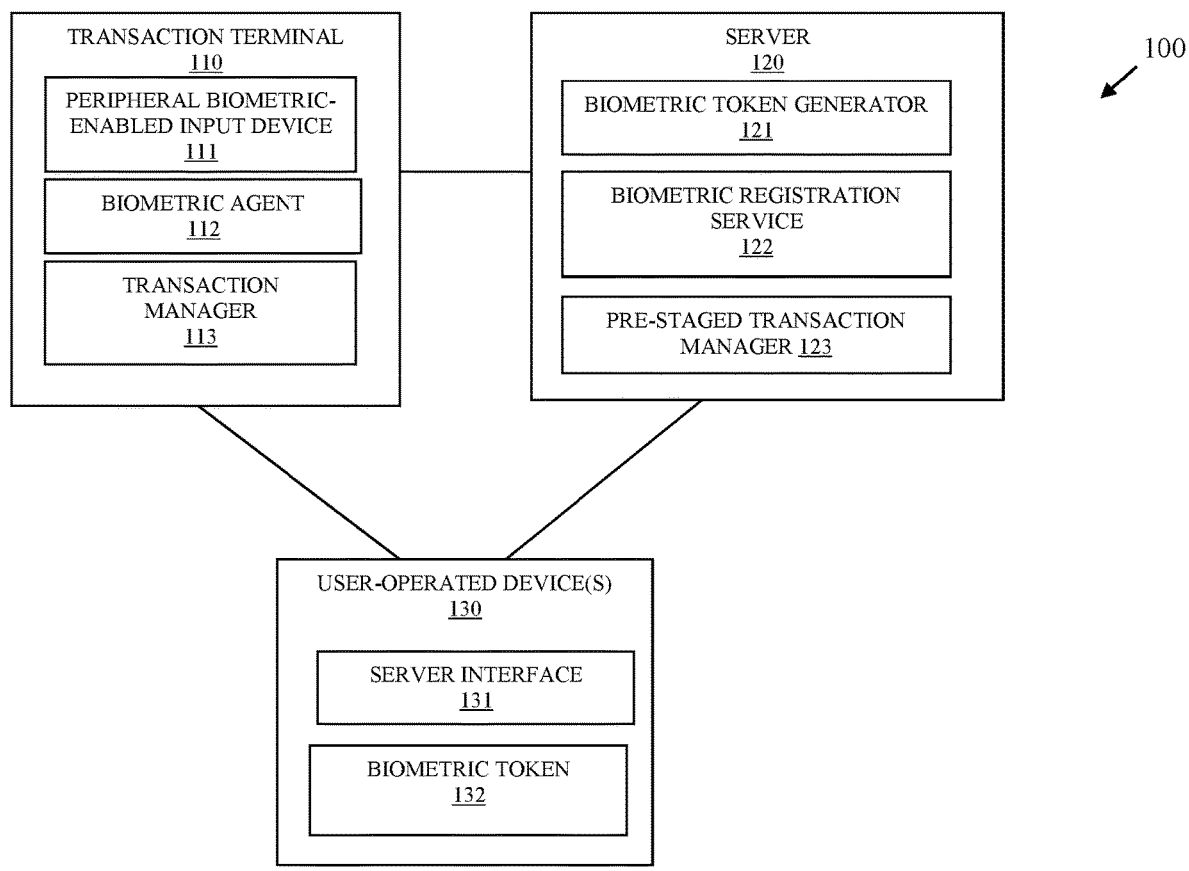
FIG. 1 is a diagram of a system for transaction authentication processing, according to an example embodiment.

FIG. 1 is a diagram of a system 100 for transaction authentication processing, according to an example embodiment, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of transaction authentication processing, presented herein and below.

As used herein and below, the terms "customer," "consumer," and "user" may be used interchangeably and synonymously.

As used herein and below, the term "operator" refers to a customer or a clerk that is operating a transaction terminal for a transaction. That is, the operator is a customer when the transaction terminal is a SST, such as a kiosk or an ATM, and the operator is a clerk assisting a customer with a transaction when the transaction terminal is a Point-Of-Sale (POS) terminal.

The system 100 includes a transaction terminal 110 (hereinafter just "terminal 110"). The terminal 110 including: a peripheral biometric-enabled input device 111 (hereinafter just "input device 111"), a biometric agent 112 (hereinafter just "agent 112"), and a transaction manager 113. It is to be noted that although not illustrated in the FIG. 1, the device also includes one or more hardware processors, volatile and non-volatile memory, non-volatile storage, and networking circuitry (such as wired ports and/or wireless transceivers).

The system 100 further includes a server 120 that is networked interfaced to the device 110 (through a wired and/or wireless network connection). The server 120 includes a biometric token generator 121 (hereinafter just "token generator 121"), a biometric registration service 122 (hereinafter just "registration service 122"), and a pre-staged transaction manager (hereinafter just "pre-staged manager 123"). The server 120 also includes, not shown in the FIG. 1, one or more hardware processors, volatile and non-volatile memory, non-volatile storage, and networking circuitry (such as wired ports and/or wireless transceivers).

Moreover, the system 100 includes one or more user-operated devices 130 (hereinafter just 5762437 device 130). The device 130 includes a server interface 131 and a biometric token 132 (hereinafter just "token 132") securely housed in non-volatile storage of the device 130. The device 130 includes, not shown in the FIG. 1, one or more hardware processors, volatile and non-volatile memory, non-volatile storage, and networking circuitry (such as wired ports and/or wireless transceivers).

The system 100 provides mechanisms for a user operating the device 130 to pre-stage a transaction with the server 120 and at a later or subsequent point in time complete processing of the transaction at the terminal 130 utilizing secure biometric authentication processing.

The agent 112, the transaction manager 113, the token generator 121, the registration service 122, the pre-staged manager 123, and the server interface are implemented as executable instructions that reside in a non-transitory computer-readable storage medium on their respective devices and the executable instructions are executed by one or more hardware processors on their respective devices.

Authentication performed at the terminal 110 does not require, in some embodiments, the user to possess any device or authentication card for proper authentication by the terminal 110.

Furthermore, the authentication performed at the terminal 110 does not require, in some embodiments, the user to affirmatively perform any act or action for proper authentication by the terminal 110 other than to make a selection from a user-facing interface of the transaction manager 113.

Furthermore, the server 120 and the terminal 110 do not retain in storage and/or memory of their respective devices any biometric data or the biometric token 132 after a pre-staged transaction is completed as a transaction at the terminal 110. In fact, the biometric data of the consumer is not retained at all except for initial token 132 generation at the server 120, as discussed below and then such biometric data is removed from the server once the token 132 is generated.

The system 100 includes at least two modes of operation: a registration mode and a transaction execution mode.

During the registration mode, a user operates the device 130 to initiate and interact with the service interface 131. The server interface 131 presents interface screens for the user to authenticate to an existing account that the user has with services of the server 120 (such as a financial/banking services) using an authentication mechanism provided by the server 120 for accessing the user's account. The device 130 and the server 120 are placed in network communication with one another for a communication session after successful user authentication with the server 120.

The user selects a biometric token registration option from the interface screens of the service interface 131. The biometric registration service 122 is initiated responsive to the user's selection of the biometric token registration option. The user then selects a biometric token type from available token types presented in the interface screens by the server interface 131. One or more peripherals of the device 130 are activated in response to the selected biometric token type by the server interface 131. Instructions are provided by the server interface 131 for the user to use the peripheral device to capture biometric data from the user. The biometric data is provided by the server interface 131 back to the token generator 121.

The token generator 121 processes the received user's biometric data based on the selected biometric type to produce a unique token 132 that can be relied upon to authenticate the user for transactions at the transaction terminal 110. This token 132 can be in a variety of formats, such as a template that includes readings and/or measurements for biometric attributes of the user. The token generator 121 returns the generated biometric token back to the server interface 131.

At this point in time during the registration mode of operation, the token generator 121 and the biometric registration service 122 deletes and removes from storage and memory of the server 120 the biometric token 132 that was generated and the received user's biometric data. The server 120 does not retain and proactively removes both the generated token 132 and the biometric data associated with the user.

This provides enhanced security to both the user and the enterprise associated with the server 120 because this private information that uniquely identifies the user through biometrics is not centrally stored on the server 120, such that should the server 120 become compromised by an intruder the token 132 and the biometric data are unavailable to the intruder.

The token 132 is received by the server interface 131 from the token generator 121 and obfuscated and/or encrypted in storage of the device 130, such that the token 132 is only accessible to the server interface 131 on the device 130.

It is to be noted that although the processing was described as a token registration process, this is not intended to mean that the server 120 retains any vestiges of the biometric data and the token 132 once the token 132 is generated and provided back to the device 130. That is, the presence of the token, control of the token, and storage of the token remains in control of the user and the user's operated device 130 following the token registration process.

During the transaction execution mode of operation for the system 100, the user accesses the service interface 131 and authenticates to the services of the server 120 using the server's authentication mechanism, which again establishes a communication session and connection between the device 130 and the server 120. (Although, it is to be noted that a user may already be in an authenticated session with the services of the server if the user is prestaging a transaction during a same session that the user first registered for receiving the biometric token 132.)

The user provides input to interface screens for pre-staging a transaction with the transaction terminal 110. The user selects a pre-stage transaction option from the presented interface screens and the server interface 131 initiates the pre-staged manager 123. At least one interface screen may ask if the user wants to use a token 132 for authenticating at the terminal 110 and if selected, the server interface 131 obtains the token 132 from the device 130 and sends the token 132 to the pre-staged manager 123. Assuming the user completed the registration processing, the token 132 is discovered and provided by the server interface 131 back to the pre-stage manager 123. When, the user indicates an option to use the token 132 but the token 132 is not found by the server interface 131, the server interface 131 can call the registration service 122 and perform the registration processing discussed above within a same authenticated communication session between the device 130 and the server.

It is to be noted that the token 132 (provided with the input for a pre-staged transaction in the transaction execution mode of operation for the system) is not the biometric data of the user but is rather a computational template produced from the user's biometric data based on a selected biometric type. Such that, the token 132 if acquired by an intruder over the network wire is useless unless the same processing that was performed by the token generator 121 is also compromised. This provides additional security with respect to the user's biometric attributes. In some cases, before the server interface 131 provides the token 132 to the pre-stage manager 123, the token 132 can be encrypted. Furthermore, the connection between the device 130 and the server 120 is an encrypted communication session that is secure. Additionally, the token 132 can include metadata that identifies the biometric type to which the token 132 is associated, such that the pre-staged manager 123 can identify the proper algorithm and processes for capturing user biometric data once the user is at the terminal 110 and is ready to authenticate for processing a transaction associated with the pre-staged transaction.

The pre-staged transaction manager 123 maintains the token 132 and the pre-staged transaction on the server 120 until the transaction associated with the pre-staged transaction is completed by the transaction manager 113 of the terminal 110 and/or until some predefined event occurs, such as user cancelation through the server interface 131, a preset elapsed period of time from creation of the pre-staged transaction during which the transaction was not processed at the terminal, etc.

When the user appears at the terminal 110 for purposes of performing a transaction representing the pre-staged transaction, the transaction manager 113 includes an operating-facing interface that includes an option for the user to authenticate by biometric authentication. The operator of the terminal 110 selects this option and then another option may appear asking for a selection by the operator of a specific type of biometric authentication. Based on these selected options, the transaction manager 113 initiates the biometric agent 112. The biometric agent 112 activates the biometric-enabled input device of the terminal 110 and provides through the operator-facing interface instructions for the user to interact with the input device so that biometric data can be captured for the user while the user is physically present at the terminal 110. The collected biometric data is then processed to generate a candidate biometric token/template and sent by the biometric agent 112 to the pre-staged transaction manager 123.

The pre-staged transaction manager 123 compares the candidate biometric token/template against a list of current pre-staged transactions that have token associates to locate the user's pre-staged transaction and the user's provided biometric token 132. Assuming a match is achieved, the pre-staged manager 123 provides the pre-staged transaction details for the pre-staged transaction back to the transaction manager 113 along with an identifier for the user and an indication that the user has been successfully authenticated.

The transaction manager 113 processes the pre-staged transaction details to complete the pre-staged transaction as a completed transaction on behalf of the user.

It is noted that this entire process occurring at the terminal 110 is achieved without the user taking any actions related to: inserting a bank card, using a mobile device for presenting a bar code, entering a PIN, or any other action relevant to authenticating the user or identifying the pre-staged transaction. The only action taken by the user (assuming the terminal 110 is a SST and the user is the operator of the terminal 110), is selection from the operator-facing interface an option for the transaction manager 113 to perform biometric authentication (and perhaps selection of a specific biometric type associated with the user's biometric token 132). It is noted that when the terminal 110 is a POS terminal, the 1-2 actions discussed above are taken by a clerk on behalf of the user at the terminal, in such case, the clerk does not require a photo identification for the user and does not even need to ask the user's name; rather, the clerk selects biometric authentication and, optionally, a user-provided biometric type, and then instructs the user to interact with the input device 111 in the manner provided by instructions of the agent 112.

So, a user can authenticate and process a pre-staged transactions with 1 or 2 interface selections and without providing any affirmative authentication information; rather such information is passively acquired from the user through the input device 111.

Once the transaction completes, both the transaction manager 113 and the pre-staged manager 123 delete from memory and storage of their respective devices the candidate token, the token 132, and any of the biometric data collected by the input device 111. Such, that should the user access the server interface 131 for a different pre-staging of a transactions, the server interface 131 needs to resupply the user's token 132 because no vestiges of the token 132 is retained anywhere in the system 100 after the initial pre-staged transaction is processed as a transaction at the terminal 110.

The processing also allows the enterprise associated with the processing to support multiple different biometric types of authentication. That is, the user defines the type of biometric that is to be processed with the token 132. This provides flexibility to the system 100 and provides integration of multiple different biometric types.

As used herein, a "biometric type" refers to the biometric attributes being captured from a user for a specific biometric authentication. Such types can include biometric data gathered for biometric attributes representing, by way of example only, a fingerprint, a palm print, a facial scan, a retina scan, a length of user digits (fingers and thumb) or some combination of user digits, a voice print, etc.

"Biometric data" includes measurements or readings collected from biometric enabled devices, such as shapes of biometric attributes, distances between attributes, patterns in attributes, lengths of attributes, color of attributes, etc.

"Biometric attributes" are the physical features obtained in images, sensor readings, and/or audio by the biometric enabled devices, such as lines and arcs in a user's finger, palm, face shape, voice pitch, thermal temperatures of user's finger/hand, etc.

"Biometric enabled devices" or "biometric input device 111" can include: a touch-enabled display, a fingerprint reader, a camera, a scanner, a retina scanner, a microphone, a video camera, a thermal sensor, etc.

In an embodiment, the biometric token 132 is a template having biometric measurements with respect to one or more of: a user's face, a user's eye, a user's finger or multiple digits of the user, and a voice pattern of the user.

A variety of optional processing can also be provided by the system 100 in some embodiments.

For example, and in an embodiment, when the user provides input for a pre-staged transaction through the server interface 131, the pre-staged transaction manager 123 can generate a unique hash based on pre-staged transaction identifier that is assigned to the user-provided token 132. When the user appears at the terminal 110 for authentication and for processing the pre-staged transaction the pre-staged transaction manager 123 validates the hash value with validation of the candidate token against the token 132. This can provide a second level of authentication, and make the token 132 only usable with a specific pre-staged transaction.

In an embodiment, the token 132 can be sent to the pre-staged transaction manager 123 for association with a pre-staged transaction at a time subsequent to when the user defined and provided the pre-staged transaction through the server interface 131. In one case, the server interface 131 includes scheduling options that the user controls, such that the user can define the date and time that the server interface 131 is to send the token 132 to the pre-staged manager 123 for association with the pre-staged transaction. In another case, the server interface 131 utilizes locations services to identify when the device 130 is within a preconfigured distance of the terminal 110 and when such distance is detected, the server interface 131 sends the token 132 to the pre-staged manager 123 for association with the pre-staged transaction. These embodiments, reduce the amount of time that the server 120 is actually in possession of the token 132, reducing the time during which the token 132 could be potentially compromised from the server 120.

In an embodiment, the device 130 is one of: a mobile phone, a wearable processing device, a desktop computer, a laptop computer, a tablet, and a device that is part of the Internet-of-Things (IoTs).

In an embodiment, the server interface 130 is an enhanced mobile banking application that includes the additional biometric token-based processing discussed herein and above and that includes existing online banking features provided by a financial institution of the user.

In an embodiment, the server interface 130 is provided through a web-based browser of the device with the web pages for the server interface 130 hosted by the server 120.

In an embodiment, the terminal 110 is one of: a SST, an ATM, a kiosk, a teller-operated terminal, and a POS terminal.

In an embodiment, the server 120 is a server that is within a Local Area Network (LAN) with the terminal 110.

In an embodiment, the server 120 is a server that is within a Wide Area Network (WAN) with the terminal 110.

In an embodiment, the interaction between the server 120 and the terminal 110 is achieved through an intermediate LAN server to which the terminal 110 is connected.

In an embodiment, the server 120 is a collection of servers that logically cooperate as a cloud-based server.

In an embodiment, the user-operated device 130 that the user operates to define a pre-staged transaction is different from a second user-operated device 130 that the user operates to initially obtain the token 132 during the registration mode of operation of the system 100. Here, an option on the device 130 is provided to the user for sending the token 132 to the device 130 where the pre-staged transaction is going to be subsequently defined. For instance, the device 130 can be another instance of terminal 110 where the user goes to initially acquire the token 132, once the token 132 is acquired, the user can obtain the token 132 for use in another device 130 in a number of manners, such as: email, text, a Universal Serial Bus (USB) memory device, etc. If the device 130 is another instance of a terminal 110, then after the token 132 is provided to the user's other device 130, the device 130 removes the token 132, such that just the device 130 that the user operates to define pre-staged transactions is the only device 130 that has possession of the token 132.

These and other embodiments are now discussed with reference to the FIGS. 2-4.

Figure 2:
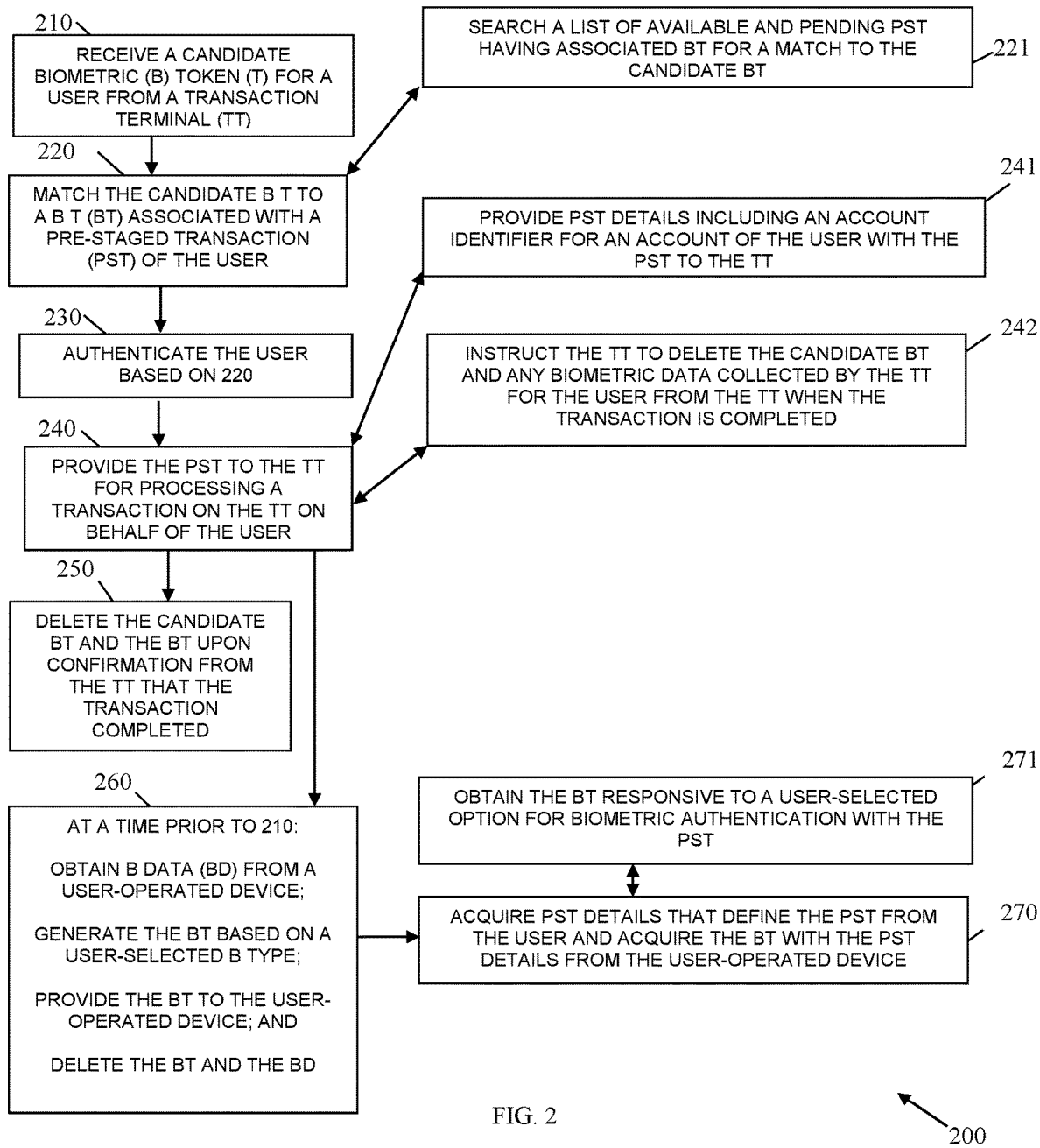
FIG. 2 is a diagram of a method for transaction authentication processing, according to an example embodiment.

FIG. 2 is a diagram of a method 200 for transaction authentication processing, according to an example embodiment. The software module(s) that implements the method 200 is referred to as a "biometric-based pre-stage transaction manager." The biometric-based pre-stage transaction manager is implemented as executable instructions programmed and residing within memory and/or a non-transitory computer-readable (processor-readable) storage medium and executed by one or more processors of a device. The processor(s) of the device that executes the biometric-based pre-stage transaction manager are specifically configured and programmed to process the biometric-based pre-stage transaction manager. The biometric-based pre-stage transaction manager has access to one or more network connections during its processing. The network connections can be wired, wireless, or a combination of wired and wireless.

In an embodiment, the device that executes the biometric-based pre-stage transaction manager is the server 120. In an embodiment, the server 120 is a cloud-based server.

In an embodiment, the biometric-based pre-stage transaction manager is all or some combination of: the token generator 121, the registration service 122, and the pre-stage manager 123.

At 210, the biometric-based pre-stage transaction manager receives a candidate biometric token for a user from a transaction terminal. This is the processing discussed above with respect to the transaction execution mode of operation for the system, where the pre-staged manager 123 is interacting with the transaction manager 113 of the transaction terminal 110. The interaction between the pre-staged manager 123 and the transaction manager 113 initiated when a user is at the terminal and an operator of the terminal has selected from the operating-facing interface of the transaction manager 113 an option to authenticate via biometric authentication, which triggers processing of the biometric agent 112 to capture biometric data for the user from the input device 111 and generate the candidate biometric token, which is then supplied by the transaction manager 113 to the biometric-based pre-stage transaction manager.

At 220, the biometric-based pre-stage transaction manager matches the candidate biometric token to a biometric token associated with a pre-staged transaction of the user.

In an embodiment, at 221, the biometric-based pre-stage transaction manager searches a list of available and pending pre-staged transactions that have an associated biometric token for a match to the candidate biometric token.

At 230, the biometric-based pre-stage transaction manager authenticates the user for processing the pre-staged transaction at the transaction terminal based on a match between the candidate biometric token and the biometric token assigned to the pre-staged transaction.

In an embodiment, a match can be determined based on a scoring technique such that a score for the biometric token and a candidate score of the candidate biometric token are within a preconfigured tolerance range of one another, such that an exact match does not have to occur for a match to exist. This is particularly useful when the peripheral device of the transaction terminal has different tolerances or quality of data capturing than that which was associated with the device that the user had when initially registering the biometric token. Furthermore, this is useful because biometric attributes of the user can gradually change or be altered such that an exact match is unrealistic.

At 240, the biometric-based pre-stage transaction manager provides the pre-staged transaction back to the transaction terminal for processing on the transaction terminal on behalf of the user.

It is noted that the transaction processed (representing the pre-staged transaction) is processed at the transaction terminal without the user being in possession of any payment card, mobile device, or even being in possession of the biometric token or any other token. The user also does not need any PIN for authentication and for the transaction to be processed. A mere single selection of an option on the transaction terminal by an operator (user or clerk assisting the user) for biometric authentication and passive acquisition of user biometric data is all that is needed for completing the pre-staged transaction. Moreover, because at any given point in time the number of actual users attempting to perform a transaction using the biometric token is relatively low, response time for searching for the biometric match to locate the pre-staged transaction is quick. The entire customer database does not need searched only those pre-staged transactions that have an associated biometric token have to be searched when the user approaches the terminal and selects authenticate by biometrics.

In an embodiment, at 241, the biometric-based pre-stage transaction manager provides pre-stage transaction details including an account identifier for an account of the user with the pre-staged transaction back to the transaction terminal. Receipt of this information is an indication to the transaction terminal that the user is authenticated and is identified for the provided transaction details.

In an embodiment, at 242, the biometric-based pre-stage transaction manager instructs the transaction terminal to delete the candidate biometric token (generated on the transaction terminal) and any biometric collected data by the transaction terminal for the user from the transaction terminal when the transaction is completed. This ensures that only the user on a user-designated device has possession of the user's biometric token once the pre-staged transaction is processed as the transaction at the transaction terminal, and ensures that no device (not even the user-designated device retails any user biometric data.

In an embodiment, at 250, the biometric-based pre-stage transaction manager deletes both the candidate biometric token and the biometric token upon confirmation from the transaction terminal that the transaction was completed on the transaction terminal. Again, no vestiges of the biometric data and biometric tokens remain on the server that processes the biometric-based pre-stage transaction manager and the transaction terminal once the transaction is completed.

In an embodiment, at 260, the biometric-based pre-stage transaction manager performs the registration mode of operation discussed above in the FIG. 1 by the pre-staged manager 123. This occurs at a time prior to the processing identified at 210. Here, the biometric-based pre-stage transaction manager obtains biometric data from a user-operated device, generates the biometric token based on a user-selected biometric type, provides the biometric token to the user-operated device for storage thereon, and deletes the biometric token and the biometric data from the server that processes the biometric-based pre-stage transaction manager.

In an embodiment of 260, and at 270 (representing a portion of the transaction execution mode of operation discussed above with the system 100), the biometric-based pre-stage transaction manager acquires pre-stage transaction details that define the pre-stage transaction from a user and acquires the biometric token with the pre-staged transaction from the user-operated device.

In an embodiment of 270, and at 271, the biometric-based pre-stage transaction manager obtains the biometric token responsive to a user-selected option for biometric authentication with the pre-staged transaction. In other words, the server interface 131 of the user-operated device makes biometric authentication with pre-staged transactions optional and when the user-selects the appropriate option when defining the pre-staged transaction, the biometric authentication transaction processing is made available for that pre-staged transaction.

Figure 3:
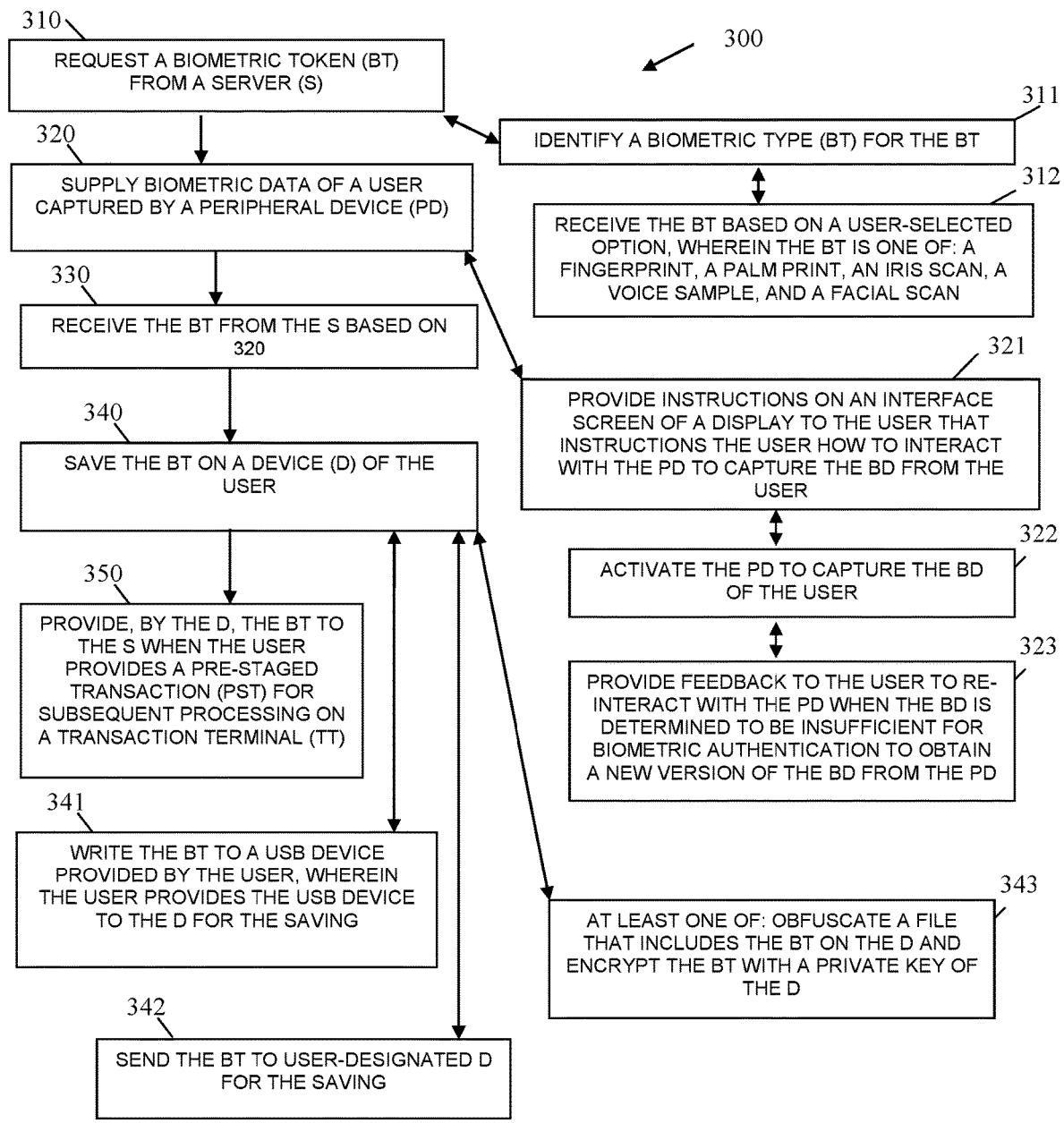
FIG. 3 is a diagram of another method for transaction authentication processing, according to an example embodiment.

FIG. 3 is a diagram of another method 300 for transaction authentication processing, according to an example embodiment. The software module(s) that implements the method 300 is referred to as a "biometric-based pre-stage transaction agent." The biometric-based pre-stage transaction agent is implemented as executable instructions programmed and residing within memory and/or a non-transitory computer-readable (processor-readable) storage medium and executed by one or more processors of a device. The processors that execute the biometric-based pre-stage transaction agent are specifically configured and programmed to process the biometric-based pre-stage transaction agent. The biometric-based pre-stage transaction agent has access to one or more network connections during its processing. The network connections can be wired, wireless, or a combination of wired and wireless.

In an embodiment, the device that executes the biometric-based pre-stage transaction agent is the device 110. In an embodiment, the device 110 is one of: a mobile phone, a wearable processing device, a tablet computer, a laptop computer, a desktop computer, and a device that is part of the IoTs.

In an embodiment, the biometric-based pre-stage transaction agent is the server interface 131.

The biometric-based pre-stage transaction agent interacts with the server 120 (in the manners discussed above with the FIG. 1) and/or the method 200.

At 310, the biometric-based pre-stage transaction agent requests a biometric token from a server. That is, a user is authenticated to an enterprise for services of that enterprise, such as banking services, and the user access the server interface 131 (representing at least a portion of the biometric-based pre-stage transaction agent) and makes a request to register (obtain) a biometric token. This request is identified by the biometric-based pre-stage transaction agent on the user-operated device 130.

In an embodiment, at 311, the biometric-based pre-stage transaction agent identifies a biometric type for the biometric token.

In an embodiment of 311, and at 312, the biometric-based pre-stage transaction agent receives the biometric type based on a user-selected option. The biometric type is one of: a fingerprint, a palm print, an iris scan, a voice sample (for voice-based biometric authentication), and a facial scan.

At 320, the biometric-based pre-stage transaction agent supplies biometric data of a user captured by a peripheral device. The biometric data corresponds to a particular biometric type.

The peripheral device can be any of the peripheral device discussed above, such as: a touch screen display, a fingerprint reader, a camera, a video camera, a microphone, a thermal sensor, a face scanner, and others.

In an embodiment, at 321, the biometric-based pre-stage transaction agent provides instructions on an interface screen of a display to the user that instructs the user on how to interact with the peripheral device to capture the biometric data from the user.

In an embodiment of 321 and at 322, the biometric-based pre-stage transaction agent activates a particular peripheral device based on a biometric type to capture the biometric data of the user.

In an embodiment of 322 and at 323, the biometric-based pre-stage transaction agent provides feedback through the interface for the user to re-interact with the peripheral device when the biometric data is determined to be insufficient for biometric authentication in order to obtain an acceptable new version of the user's biometric data from the peripheral device.

At 330, the biometric-based pre-stage transaction agent receives the biometric token back from the server based on the biometric data supplied at 320.

At 340, the biometric-based pre-stage transaction agent saves the biometric token on a device of the user.

In an embodiment, at 341, the biometric-based pre-stage transaction agent writes the biometric token to a USB device provided by the user and interfaced to the particular device that is executing the biometric-based pre-stage transaction agent. Here, the particular device executing the biometric-based pre-stage transaction agent may be a different device from a device that the user operates to supply a pre-staged transaction and the user acquires the biometric token during the registration mode of operation on the USB device and then subsequently interfaces the USB device to the device that the user accesses for supplying a pre-staged transaction.

In an embodiment, at 342, the biometric-based pre-stage transaction agent sends the biometric token to a user-designated device for the saving of the biometric token. This can be done through wireless transactions, such as Wi-Fi, Bluetooth®, Radio Frequency (RF), and/or Near Field Communication (NFC). This can also be done through SMS text messaging and/or through email. Again, this is an embodiment, where the registration mode of processing is done on a different device from a device that the user operates when supplying a pre-staged transaction.

In an embodiment, at 343, the biometric-based pre-stage transaction agent performs one or more of: obfuscation of a file on the device (the file including the biometric token) and encryption of the biometric token with a private key of the device. This is an embodiment, were the user is operating a same device for the registration mode of operation as a device that is operated for providing the pre-staged transactions defined by the user.

At 330, the biometric-based pre-stage transaction agent provides the biometric token when the user provides a pre-staged transaction for subsequent processing on a transaction terminal.

It is to be noted that the biometric token is only retained on the device that the user operates when supplying the pre-staged transaction to the server for staging, such that the device in possession of the biometric token is capable of supplying the biometric token for biometric authentication at the time that the user defines and provides the pre-staged transactions to the server.

In an embodiment, multiple independent executing instances of the biometric-based pre-stage transaction agent are processed in performing the method 300, such that the processing associated with 310-340 is performed by a first instance of the biometric-based pre-stage transaction agent on a first registration device and the processing associated with 350 is performed by a second instance of the biometric-based pre-stage transaction agent on a second device.

In an embodiment, the biometric-based pre-stage transaction agent performs all of the processing recited 310-351 on a single and same device.

Figure 4:
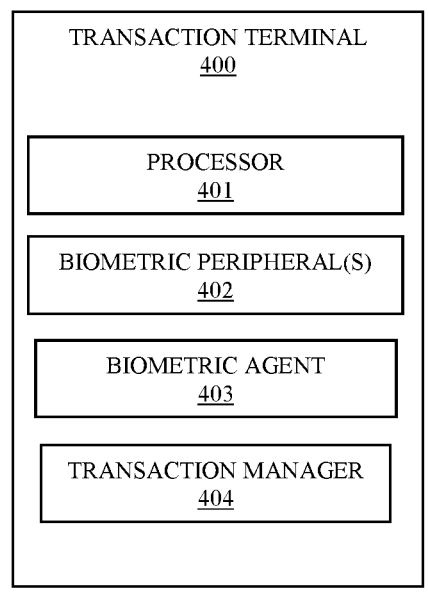
FIG. 4 is a diagram of a transaction terminal for transaction authentication processing, according to an example embodiment.

FIG. 4 is a diagram of a transaction terminal 400 for transaction authentication processing, according to an example embodiment. The transaction terminal 400 includes a variety of hardware components and software components. The software components of the transaction terminal 400 are programmed and reside within memory and/or a non-transitory computer-readable medium and execute on one or more processors of the transaction terminal 400. The transaction terminal 400 communicates over one or more networks, which can be wired, wireless, or a combination of wired and wireless.

In an embodiment, the transaction terminal 400 implements, inter alia, the processing described above with the FIGS. 1-3 with respect to the transaction terminal 110.

In an embodiment, transaction terminal 400 is the terminal 110. In an embodiment, the terminal 400 is one of: a SST, an ATM, a kiosk, and a POS terminal.

The transaction terminal 400 includes at least one hardware processor 401, one or more biometric peripherals 402, a biometric agent 403, and a transaction manager 404.

In an embodiment, at least one of the biometric peripherals 402 is the biometric-enabled input device 111. In an embodiment, the input device 111 is one or more of: a touch-enabled display, a camera, a video camera, a scanner, a retina scanner, a fingerprint reader, a thermal sensor, and a microphone.

In an embodiment, the biometric agent 403 is the biometric agent 112.

In an embodiment, the transaction manager 404 is the transaction manager 113.

The biometric agent 403 and the transaction manager 404 are executable instructions that are executed from a non-transitory computer-readable medium by the hardware processor 401.

The transaction manager 404 is configured to: receive a biometric authentication request for a pre-staged transaction of a user, activate the biometric agent 403 on the transaction terminal 400, supply a candidate biometric token provided by the biometric agent 403 to a server, receive pre-stage transaction details for the pre-staged transaction from the server when the user is authenticated by the server from the candidate biometric token; process the pre-staged transaction details to complete a transaction at the transaction terminal 400 on behalf of the user.

The biometric agent 403 is configured to: activate the at least one biometric peripheral 402 when the biometric agent 403 is activated by the transaction manager 404, obtain biometric data captured for the user by the at least one biometric peripheral 402, generate the candidate biometric token from the biometric data, and provide the candidate biometric token to the transaction manager 404.

In an embodiment, the transaction manager 404 is further configured to delete the biometric data of the user and the candidate biometric token from memory and storage on the transaction terminal 400 when the transaction is completed on the transaction terminal 400.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
    receiving a selected biometric type from a user;
    capturing biometric measurements from the user that correspond to the selected biometric type;
    generating a biometric token from the biometric measurements based on the biometric type;
    associating the biometric token with a pre-staged transaction defined by the user and a user identifier for the user;
    providing the biometric token and a pre-staged transaction identifier for the pre-staged transaction to the user;
    identifying the user at the transaction terminal;
    authenticating the user to a user identifier and an account;
    searching a list of pre-staged transactions for a match on the user identifier;
    obtaining the biometric token, the selected biometric type, and the pre-staged transaction identifier from the match;
    providing the biometric token, the selected biometric type, and pre-staged transaction details associated with the pre-staged transaction identifier to the transaction terminal;
    instructing the transaction terminal to capture candidate biometric features of the user at the transaction terminal based on the selected biometric type, calculate a candidate biometric token from the candidate biometric features based on the selected biometric type, authenticate the user for performing the pre-staged transaction when the candidate biometric token matches the biometric token, and perform the pre-staged transaction when the user is authenticated using the pre-staged transaction details; and
    removing the biometric token from the list of pre-staged transactions upon confirmation that the transaction terminal processed the pre-staged transaction on behalf of the user at the transaction terminal.

2. The method of claim 1, wherein receiving further includes authenticating the user to an account before receiving the selected biometric type from the user.

3. The method of claim 2, wherein capturing further includes activating one or more biometric-enabled devices of a user-operated device based on the selected biometric type.

4. The method of claim 3, wherein generating further includes obtaining the biometric measurements from one or more biometric-enabled devices of the user-operated device that is a transaction terminal.

5. The method of claim 3, wherein generating further includes obtaining the biometric measurements from the one or more biometric-enabled devices of the user-operated device that is a mobile phone, a wearable processing device, a desktop computer, a laptop computer, or a tablet computer.

6. The method of claim 1 further comprising:
    identifying the user at a transaction terminal;
    receiving a selection from the user for a registered biometric type;
    activating biometric-enabled devices of the transaction terminal based on the registered biometric type;
    receiving candidate biometric features captured by the biometric-enabled devices;
    calculating candidate biometric measurements from the biometric features based on the registered biometric type;
    generating a candidate biometric token from the candidate biometric measurements;
    searching a list of pre-staged transactions for a match on the candidate biometric token and obtaining from the match the user identifier and the pre-staged transaction identifier for the pre-staged transaction; and
    providing the transaction terminal pre-staged transaction details and the user identifier for processing the pre-staged transaction on behalf of the user.

7. The method of claim 6 further comprising, removing the candidate biometric token from memory and deleting the biometric token and the pre-staged transaction from the list of pre-staged transactions once the transaction terminal confirms the pre-staged transaction was processed on behalf of the user at the transaction terminal.

8. The method of claim 1 further comprising, instructing the transaction terminal to remove from memory and any storage of the transaction terminal, the candidate biometric features, the candidate biometric token, and the biometric token.

9. The method of claim 1 further comprising:
    receiving the biometric token from a user at a transaction terminal;
    identifying the selected biometric type associated with the biometric token;
    searching a list of pre-staged transactions for a match on the biometric token;
    obtaining the pre-staged transaction identifier, the user identifier for the user, and pre-staged transaction details from the match;
    instructing the transaction terminal to capture biometric features of the user at the transaction terminal based on the selected biometric type;
    receiving the biometric features from the transaction terminal;
    generating a candidate biometric token from the biometric features based on the selected biometric type; and
    providing the user identifier, the pre-staged transaction identifier, and the pre-staged transaction details to the transaction terminal along with instructions to process the pre-staged transaction on behalf of the user using the pre-staged transaction details when the candidate biometric token matches the biometric token.

10. A method, comprising:
registering, by a server, a user for biometric authentication based on a user-selected biometric type, biometric measurements calculated from biometric features captured for the user based on the user-selected biometric type, and based on a biometric token derived from the biometric measurements;
providing, by the server, the biometric token to a user-operated device;
deleting, by the server, the biometric token from memory and storage and retaining a user identifier and the user-selected biometric type as a registered user for the biometric authentication;
receiving, by the server, pre-staged transaction details for a pre-staged transaction and the biometric token from the registered user;
associating, by the server, a pre-staged transaction identifier for the pre-staged transaction details, the user identifier, the user-selected biometric type, and the biometric token together as an entry in a list of pre-staged transactions;
receiving, by the server, a notification that the registered user is present at a transaction terminal to perform the pre-staged transaction at the transaction terminal using the biometric authentication;
obtaining, by the server, the entry from the list of pre-staged transactions;
instructing, by the server, the transaction terminal to activate biometric-enabled devices of the transaction terminal and capture candidate biometric features of the registered user based on the user-selected biometric type;
receiving, by the server, the candidate biometric features from the transaction terminal;
calculating, by the server, candidate biometric measurements from the candidate biometric features based on the user-selected biometric type;
generating, by the server, a candidate biometric token from the candidate biometric measurements;
comparing, by the server, the candidate biometric token against the biometric token obtained from the entry in the list of pre-staged transactions; and
providing, by the server, the pre-staged transaction identifier and the pre-staged transaction details to the transaction terminal and authorizing the transaction terminal to process the pre-staged transaction on behalf of the registered user based on the comparing.

11. The method of claim 10 further comprising, deleting the entry from the list of pre-staged transactions from memory and storage when the transaction terminal confirms that the pre-staged transaction was processed on behalf of the registered user.

12. The method of claim 10, wherein registering further includes instructing a user-operated device that is a phone, a laptop, a desktop, a wearable processing device, or a tablet to activate peripherals of the user-operated device and capture and provide the biometric features back to the server during a registration for the biometric authentication.

13. The method of claim 12, wherein instructing the user-operated device further includes calculating, by the server, the biometric measurements from the biometric features based on the user-selected biometric type.

14. The method of claim 10, wherein comparing further includes authenticating the registered user for performing the pre-staged transaction when the candidate biometric token is within a preconfigured tolerance range of the biometric token.

15. The method of claim 10, wherein associating further includes generating a unique hash value associated with the pre-staged transaction identifier and the biometric token and retaining the hash value without retaining the biometric token with the entry and with list of pre-staged transactions.

16. The method of claim 15, wherein comparing further includes generating a second unique hash value from the candidate biometric token and the pre-staged transaction identifier and comparing the unique hash value against the second unique hash value in place of comparing the candidate biometric token against the biometric token since the biometric token is missing from the entry and was replaced with the unique hash value.

17. A system, comprising:
a server comprising a processor and a non-transitory computer-readable storage medium;
the non-transitory computer-readable storage medium comprises executable instructions; and
the executable instructions when executed by the processor from the non-transitory computer-readable storage medium cause the processor to perform operations comprising:
registering a user as a registered user for biometric authentication by recording a user-selected biometric type with a user-identifier linked to a user account and by capturing biometric attributes of the registered user, calculating biometric measurements for the biometric attributes based on the user-selected biometric type, and generating a biometric token based on the biometric measurements;
providing the biometric token to the registered user;
receiving pre-staged transaction details for a pre-staged transaction that is being pre-staged by the registered user for the user account;
generating a pre-staged transaction identifier for the user-identifier and user account;
providing the pre-staged transaction identifier to the registered user;
generating a hash value using the pre-staged transaction identifier and the biometric token;
adding the user identifier, the pre-staged transaction identifier, the user-selected biometric type, and the hash value as an entry to a list of pre-staged transactions;
removing the biometric attributes, the biometric measurements, and the biometric token from memory and storage of the server;
receiving an indication from a transaction terminal that the registered user is present at the transaction terminal and provided the biometric token with the user-selected biometric type and the pre-staged transaction identifier;
instructing the transaction terminal to capture candidate biometric attributes using terminal peripheral devices based on the user-selected biometric type;
receiving the candidate biometric attributes from the transaction terminal;
calculating candidate biometric measurements from the candidate biometric attributes based on the user-selected biometric type;
generating a candidate biometric token from the candidate biometric measurements;
generating a second hash value using the candidate biometric token and the pre-staged transaction identifier;
obtaining the entry from the list of pre-staged transactions using the pre-staged transaction identifier; and
comparing the hash value of the entry against the second hash value and authorizing the transaction terminal to perform the pre-staged transaction on behalf of the registered user when the hash value is within a preconfigured tolerance range of the second hash value by providing the transaction terminal the user identifier and the pre-staged transaction details for processing at the transaction terminal.

18. The system of claim 17, wherein the executable instructions when executed by the processor from the non-transitory computer-readable storage medium further cause the processor to perform additional operations comprising:
  instructing the transaction terminal to delete from memory and storage of the transaction terminal the candidate biometric attributes; and
  removing from memory and storage of the server the candidate biometric features, the second hash value, the candidate biometric measurements, the candidate biometric token, and the entry from the list of pre-staged transactions.

* * * * *